Nov. 27, 1934.    R. C. EVANS    1,981,995
FRAME ASSEMBLY FOR MOUNTING A UNITARY DEVICE ON AN AUTOMOBILE CHASSIS
Filed Dec. 4, 1933
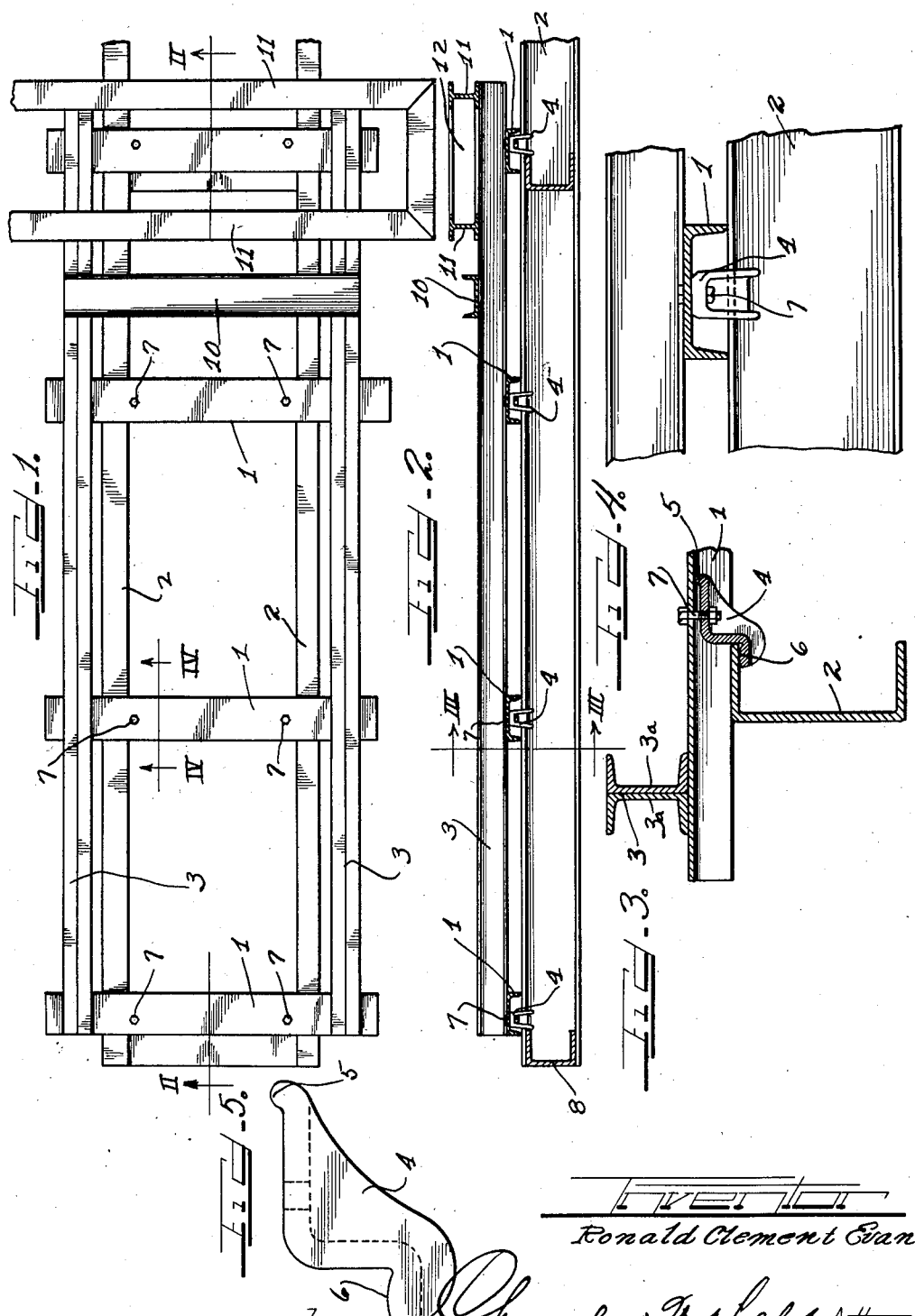

UNITED STATES PATENT OFFICE 1,981,995

FRAME ASSEMBLY FOR MOUNTING A UNITARY DEVICE ON AN AUTOMOBILE CHASSIS

Ronald Clement Evans, Elgin, Ill., assignor to Municipal Appliance Company, New York, N. Y., a corporation of Maine Application December 4, 1933, Serial No. 700,931

2 Claims. (Cl. 296—9)

This invention relates to a frame assembly for mounting a unitary structure upon any supporting base such as the chassis of a motor vehicle.

The invention consists primarily in a frame adapted for supporting a machine such as an eductor unit that is moved from place to place for cleaning out catch basins. More specifically, the invention comprises a suitable frame structure together with means for readily clamping the same in any desired position upon the chassis of a motor vehicle.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a top plan view of a frame assembly involving this invention.

Figure 2 is a sectional view taken upon the line II—II of Figure 1 looking in the direction of the arrows.

Figure 3 is an enlarged sectional view taken upon the line III—III of Figure 2 looking in the direction of the arrows.

Figure 4 is an enlarged fragmentary sectional view taken upon the line IV—IV of Figure 1 looking in the direction of the arrows.

Figure 5 is an elevational view of a clamping member designed for clamping the frame assembly to a base such as the chassis of a motor vehicle.

In the drawing, there is illustrated a structure embodying one form that the invention may assume. This structure comprises a plurality of transverse inverted channel bars 1 which are adapted to be supported upon the frame of the chassis and which frame comprises the channel bars 2. Upon the channel bars 1 are I-beams 3 which are formed by placing a pair of channel bars 3ª back to back as shown more clearly in Figure 3.

The frame assembly comprising the transverse channel bars 1 and the I-beam 3 is adapted to be clamped to the vehicle frame or chassis by a plurality of clamps 4. Each clamp 4 is substantially Z-shaped. The upper portion of each clamp is provided with a heel 5 adapted for engaging the lower surface of the web of a transverse channel bar 1. The lower portion of each clamp is provided with a rounded cam surface 6 which is adapted for engaging beneath the upper flange of a channel member 2. A bolt 7 connects each clamp to a transverse channel bar 1 and as this bolt is tightened, the clamp can slightly pivot on its heel 5 and roll on its cam portion 6 so that it can readily adjust itself in accordance with any irregularity in the members that it connects. It will be appreciated that by loosening the bolts 7, the frame can be longitudinally adjusted upon the vehicle chassis.

The chassis frame comprises a rear transverse channel member 8 as shown more clearly in Figure 2. The rear clamping members 4 are adapted to abut the upper flange of the channel bar 8 for preventing rearward sliding movement of the frame. It will be noted that each transverse channel member 1 has a pair of clamps, one adjacent each channel bar 2 for clamping each bar 1 to both channel bars 2.

The frame assembly just described may be equipped with auxiliary frames for supporting machinery such as pumps and motors and which are adapted for use in an eductor unit. In the present instance, there is shown a transverse channel bar 10 upon the frame adapted for supporting a compression pump or the like. At the forward end of the frame are shown a pair of transverse I-beams 11 which are arranged in parallel relation and connected by a bar 10 to form a motor support.

It will be appreciated that the frame assembly as above set forth is adapted for supporting an apparatus with all of its parts in proper relation and it merely becomes necessary to attach such frame to a vehicle chassis. According to this invention, such frame may be readily attached or removed with respect to the vehicle chassis without the necessity of drilling holes and using bolts for holding the same together. A great deal of time and labor is adapted to be saved in utilizing such a frame assembly.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a vehicle frame structure including a chassis frame having longitudinal channel members, and a second frame of channel members superimposed upon said chassis frame and adjustably clamped thereto, means for frictionally clamping the frames together, comprising a clamping member in the form of a right angle having a horizontal leg provided with an extension for frictional clamping engagement with a member of said upper or second frame and a vertical leg provided with an extension for frictional clamping engagement with a frame member of the lower or chassis frame, said clamping member having an intermediate attaching element for securing it to one of the frame members, and about which element the clamping member is adjustable to bring its extensions into tight frictional engagement with the respective frame members.

2. In a vehicle frame structure including a chassis frame having longitudinal channel members, and a second frame of channel members superimposed upon said chassis frame and adjustably clamped thereto, means for frictionally clamping the frames together, comprising a clamping member in the form of a right angle having a horizontal leg provided with an extension for frictional clamping engagement with a member of said upper or second frame and a vertical leg provided with an extension for frictional clamping engagement with a frame member of the lower or chassis frame, said clamping member having an intermediate attaching element for securing it to one of the frame members, and about which element the clamping member is adjustable to bring its extensions into tight frictional engagement with the respective frame members, one of said extensions comprising an upwardly extending tip on the end of the horizontal leg and the other comprising a laterally extending cam portion on the vertical leg, both of said portions facing upwardly in a direction toward the superimposed frame.

RONALD CLEMENT EVANS.